United States Patent
Reckdahl

[19]

[11] Patent Number: 6,141,606
[45] Date of Patent: Oct. 31, 2000

[54] WHEEL SPEED CONTROL SYSTEM FOR SPACECRAFT WITH REJECTION OF NULL SPACE WHEEL MOMENTUM

[75] Inventor: Keith J. Reckdahl, Palo Alto, Calif.

[73] Assignee: Space Systems/Loral, Inc., Palo Alto, Calif.

[21] Appl. No.: 09/123,767

[22] Filed: Jul. 28, 1998

[51] Int. Cl.[7] ............................... B64G 1/28; G05D 1/00
[52] U.S. Cl. ........................ 701/13; 701/3; 244/158 R; 244/165; 244/166
[58] Field of Search ................... 244/158 R, 165, 244/166; 701/13

[56] References Cited

U.S. PATENT DOCUMENTS

| | | |
|---|---|---|
| 4,071,211 | 1/1978 | Muhlfelder et al. ............... 244/165 |
| 4,260,942 | 4/1981 | Fleming ............................. 318/565 |
| 5,058,835 | 10/1991 | Goodzeit et al. ................. 244/165 |
| 5,201,833 | 4/1993 | Goodzeit et al. ................. 244/165 |
| 5,205,518 | 4/1993 | Stetson, Jr. ....................... 244/165 |

*Primary Examiner*—Michael J. Zanelli
*Assistant Examiner*—Eric M. Gibson
*Attorney, Agent, or Firm*—Perman & Green, LLP

[57] ABSTRACT

A spacecraft attitude control system uses at least four reaction wheels In order to minimize reaction wheel speed and therefore power, a wheel speed control means system is provided. The wheel speed control means monitors the wheel speeds and controls wheel speed nullspace components to keep the wheel speeds as small as possible.

20 Claims, 3 Drawing Sheets

WHEEL SPEED CONTROL SYSTEM FOR SPACECRAFT WITH REJECTION OF NULL SPACE WHEEL MOMENTUM

BACKGROUND OF THE INVENTION

1. Field of the Invention

The present invention relates to spacecraft having momentum wheels for attitude control, and more particularly to a control system for a spacecraft using at least four momentum wheels to store three-dimensional momentum. The invention also applies to a spacecraft using at least three momentum wheels to store two-dimensional momentum or a spacecraft using at least two momentum wheels to store one-dimensional momentum.

2. Background Art

Orbiting spacecraft are used for a large variety of sensing and communication purposes. For some applications, it may be desirable for the spacecraft to be relatively near the Earth. For communication purposes, a geosynchronous equatorial orbit is often desirable. However, whatever the orbit, a satellite must be stabilized in space if the sensors or antennas are to be pointed in appropriate directions.

Spacecraft attitude stabilization may be accomplished by spinning the spacecraft and by mounting the sensors or antennas on a stabilized despun platform. Alternatively, the spacecraft may be stabilized in three axes. Three-axis stabilization may be accomplished by a control system using fuel-burning thrusters, but the use of such thrusters requires the expenditure of fuel, which tends to limit the service life of the spacecraft. Another method for three- axis stabilization uses magnetic coils or torquers which interact with the magnetic fields of the heavenly body being orbited to provide the desired torques. Magnetic torquers have the disadvantages that the available torques tend to be small, and undesirably dependent upon the local magnitude of the magnetic field of the particular heavenly body being orbited. The magnetic fields change from time to time and from location to location. The salient advantage of magnetic torquers, however, is that their operation requires only electrical energy, which may be a renewable resource on spacecraft equipped with solar panels.

Larger torques than those available by the use of magnetic torquers may be achieved with electrically driven reaction wheels or momentum wheels. Such wheels are also electrically driven and have the advantage of being able to provide relatively large torques regardless of orbital position.

In principle, a three-axis stabilized spacecraft requires only three mutually orthogonal reaction wheels or momentum wheels (referred to herein as "reaction wheels" or "wheels"). In order to provide for redundancy in the event that one of three orthogonal wheels should fail, spacecraft often include at least one additional reaction wheel, oriented at a skew angle relative to the other three. The fourth wheel provides redundancy for all three wheels because it provides momentum components along the three other axes. Thus, the skew reaction wheel may be used in conjunction with two of the other wheels to control the spacecraft attitude.

Increased expectations relating to the performance of spacecraft and improved capabilities have led to a continuing increase in the size of spacecraft. The increased size in turn requires greater torque and momentum capability along each momentum wheel control axis. Rather than use three larger mutually orthogonal reaction wheels with a skew wheel, it has been found that there are advantages to using four or more skewed smaller reaction wheels to obtain the required momentum and torque. When four or more reaction wheels are used, modern control techniques utilize all the wheels during operation.

When four or more reaction wheels are used for control, a given net momentum of the wheels may be achieved by many different wheel speed combinations, i.e., the three body momentum components are mapped into an infinite number of wheel momentum combinations.

During attitude control operations, the various reaction wheels are accelerated and decelerated to apply desired torques to the spacecraft body. For a given total spacecraft momentum, each wheel speed will drift from its optimal value, because of the under-determined nature of the wheel control, thereby increasing the total power consumption. In the worst case, a wheel may reach its maximum speed, even though the total wheel stored momentum is small. Thus, a speed management arrangement is necessary.

A known prior art speed management arrangement allows the wheel speeds to drift from their power optimal values and monitors the speed of each reaction wheel. When one of the reaction wheels reaches a predetermined speed threshold, it is shut off. This wheel's speed decreases to zero due to friction, and the wheel's momentum is redistributed to the other operational wheels. In this process a drawback is the disturbance of the friction torque of the disabled wheel. This friction torque results in an attitude error.

A wheel speed management arrangement is desired that maintains each wheel at its power optimal speed without imparting a disturbance to the spacecraft. Such a system is described in U.S. Pat. No. 5,058,835 issued Oct. 22, 1991 to Goodzeit et al. entitled WHEEL SPEED MANAGEMENT CONTROL SYSTEM FOR SPACECRAFT that discloses a wheel speed management system for a spacecraft that uses at least four reaction wheels for attitude control.

The management system disclosed by Goodzeit et al. monitors the wheel speeds and generates a wheel speed error vector. The error vector is integrated, and the error vector and its integral are combined to form a correction vector. The correction vector is summed with the attitude control torque command signals for driving the reaction wheels The present invention is distinct from the system disclosed in the Goodzeit et al. patent in that it does not require generating a wheel speed error vector because the present invention controls wheel speed nullspace components instead of wheel speed errors.

Furthermore, the present invention has the flexibility to control the nullspace components to non-zero values, which is a capability not possible with the system disclosed in the Goodzeit et al. patent.

SUMMARY OF THE INVENTION

It is an object of the present invention to provide an improved wheel speed control system for spacecraft momentum wheels Another object of the present invention is to provide a wheel speed control system that controls wheel speed nullspace components.

Still another object of the present invention is to provide a wheel speed control system that reduces wheel speed nullspace components to desired values which are often zero.

Other and further features, advantages and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention and, together with the description, serve to explain the principles of the invention in general terms. Like numerals refer to like parts throughout the disclosure.

DESCRIPTION OF THE INVENTION

Figure 1:
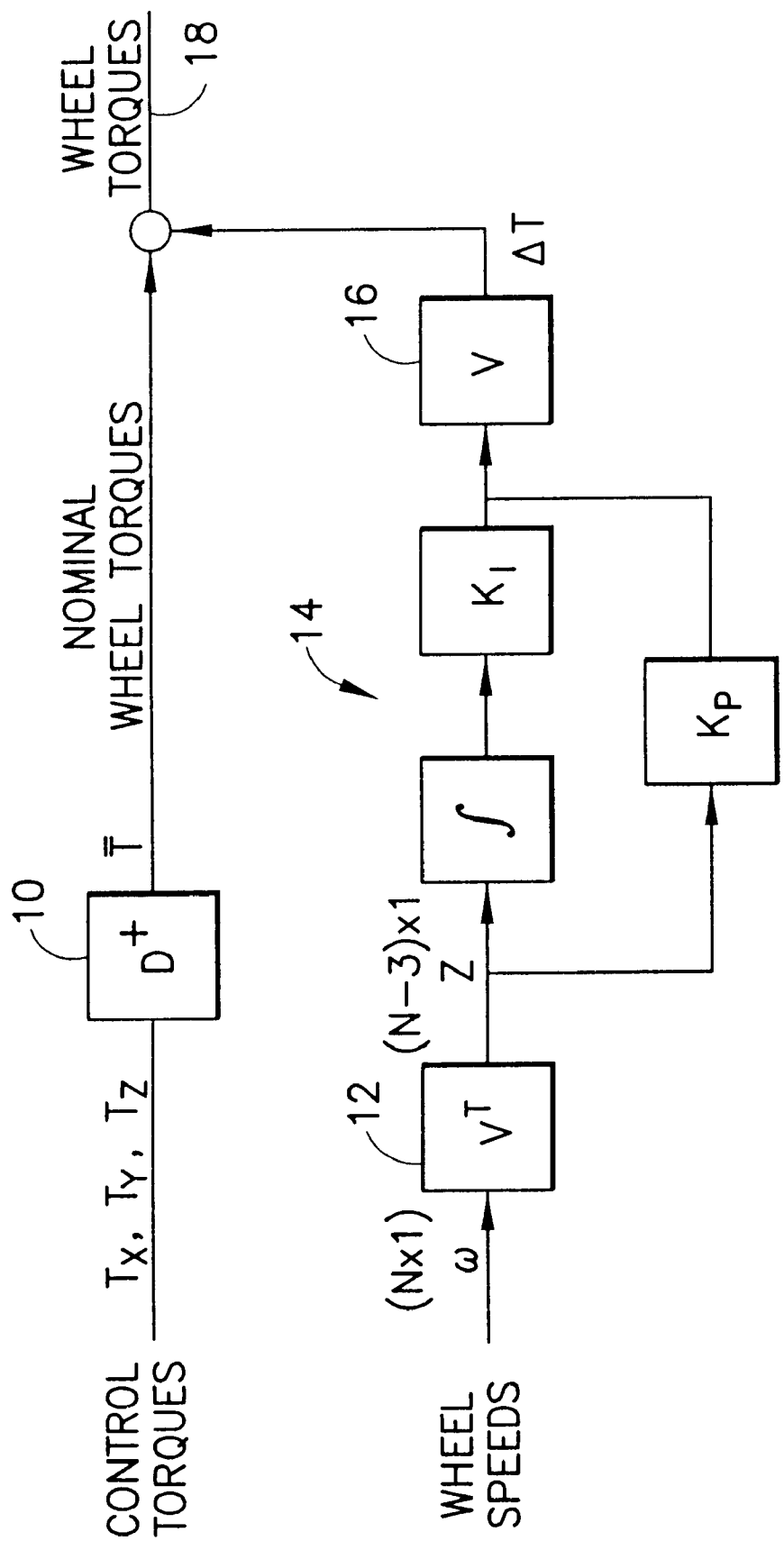
FIG. 1 is a schematic block diagram of an embodiment of a momentum wheel control system according to the principles of the present invention.

When a spacecraft uses exactly three momentum wheels, exactly one set of wheel speeds produce one desired particular total momentum. However, when a spacecraft uses more than three momentum wheels, multiple sets of wheel speeds can produce the same one total momentum. Unless the control system functions to keep the wheel speeds small, the wheel speeds can become quite large even though a set of smaller speeds would produce the same momentum. In the present invention a wheel speed control system is provided that makes it possible to maintain the smallest (least-squares) wheels speeds possible, which maximizes the momentum capacity of the wheels.

Consider a spacecraft B with N momentum wheels $W_1 \ldots, W_N$ whose axes are parallel to the spacecraft-fixed vectors $W_1 \ldots, W_N$ respectively. The terms $b_x$, $b_y$, $b_z$ are defined as a right-hand set of orthonormal vectors fixed in B.

The terms $\omega_I$ (i=1, . . . ,N) are defined as the wheel speeds with respect to the spacecraft. When all the wheels have an axial moment of inertia J, the total angular momentum of the wheels in B can be expressed as $J\omega_1 w_1 + \ldots + J\omega_N w_N$. Defining $h_x$, $h_y$, $h_z$ as the $b_x$, $b_y$, $b_z$ components of the total wheel momentum can be expressed as $$\begin{bmatrix} h_x \\ h_y \\ h_z \end{bmatrix} = DJ \begin{bmatrix} \omega_1 \\ \vdots \\ \omega_N \end{bmatrix} \quad (1)$$

where D is an 3×N matrix. When N>3, D has more columns than rows and one can construct M≙N−3 column matrices column matrices $V_1, \ldots M$ which form an orthonormal basis for the row nullspace of D (that is $DV_i=0$, and $V \cdot V_i=1$, and $V \cdot V_j=0$ for i≠j)

A property of the nullspace vectors $V_1, \ldots, V_M$ is that adding them to the wheel speeds does not affect the overall momentum of the spacecraft. Thus when $C_1, \ldots, C_M$ are any scalars, the wheel speeds $$\begin{bmatrix} \omega_1 \\ \vdots \\ \omega_N \end{bmatrix} = \begin{bmatrix} \varpi_1 \\ \vdots \\ \varpi_N \end{bmatrix} + \sum_{i=1}^{M} C_i V_i \quad (2)$$

correspond to the same total momentum as $$\begin{bmatrix} \omega_1 \\ \vdots \\ \omega_N \end{bmatrix} = \begin{bmatrix} \varpi_1 \\ \vdots \\ \varpi_N \end{bmatrix} \quad (3)$$

To maximize the momentum capacity, it is desirable to choose the values of $C_1, \ldots, C_M$ to make the wheel speeds as small as possible. To minimize $\omega_1^2 + \ldots \omega_N^2$, the values of $\omega_1 \ldots, \omega_N$ must satisfy the following M equations $$V_i^T \begin{bmatrix} \omega_1 \\ \vdots \\ \omega_N \end{bmatrix} = 0 \ (i = 1, \ldots, M) \quad (4)$$

The previous section of this description explained that it is desirable to control the wheels speeds such that they satisfy equation (4). The way to achieve this goal is described below.

Define $T_i$ (i=1, . . . , N) as the axial measure number of the wheel torque exerted by wheel $w_i$ on the spacecraft B. The total torque on B can then be expressed as $$T^B = T_1 w_1 + \ldots + T_N w_N \quad (5)$$

When $T_x, T_y, T_z$ are defined as the torque scalars $$T_x = T \cdot b_x \quad (6)$$
$$T_y = T \cdot b_y$$
$$T_z = T \cdot b_z$$

The relationship between these variables can be written as $$\begin{bmatrix} T_x \\ T_y \\ T_z \end{bmatrix} = D \begin{bmatrix} T_1 \\ \vdots \\ T_N \end{bmatrix} \quad (7)$$

where D is the same 3×N matrix as in equation (1). When there are exactly three momentum wheels, only one set of values for $T_1, T_2, T_3$ can produce any set of $T_x, T_y, T_z$ values, However when there are more than three wheels, many sets of $T_1, \ldots, T_N$ values exist which produce any particular set of $T_x, T_y, T_z$ values. Just as adding the nullspace matrices $V_1, \ldots, V_M$ to the wheel speeds does not affect the total momentum, adding $V_1, \ldots, V_M$ to the torque scalars does not affect the total torque on B. Thus when $C_1, \ldots, C_M$ are any scalars, the values of $T_x, T_y, T_z$ corresponding to $$\begin{bmatrix} T_1 \\ \vdots \\ T_N \end{bmatrix} = \begin{bmatrix} \overline{T}_1 \\ \vdots \\ \overline{T}_N \end{bmatrix} + \sum_{i=1}^{M} C_i V_i \quad (8)$$

are the same as those corresponding to $$\begin{bmatrix} T_1 \\ \vdots \\ T_N \end{bmatrix} = \begin{bmatrix} \overline{T}_1 \\ \vdots \\ \overline{T}_N \end{bmatrix} \quad (9)$$

The present invention employs this flexibility to choose values for $T_1, \ldots, T_N$ such that the desired values of $T_x, T_y, T_z$ are produced while keeping the wheel speeds as small as possible.

The present invention keeps the wheel speeds as small as possible by driving the nullspace components to zero. An embodiment of a system for providing wheel torques according to the present invention is illustrated by the block diagram of FIG. 1 and by the more detailed block diagram of elements 12, 14 and 16 in FIG. 3. In FIG. 1, for a spacecraft having N momentum wheels with axes $w_1 \ldots w_n \ldots$, the control torque signals which are torque commands Tx, Ty and Tz obtained from the spacecraft attitude sensors are applied to processor 10 that generates matrix signals and provides an output signal $\overline{T}$ representative of nominal wheel torques.

Current wheel speeds $\omega_1, \omega_2, \omega_3, \ldots, \omega_n$ of the spacecraft momentum wheels are applied to processor 12 that carries out a matrix multiplication to provide an output signal z which is the scalar nullspace value of the wheel speeds. The z signal is applied to integrator means 14 that generates the integral signal I then matrix multiplication means 16 provides $\Delta T$ signals that are applied to the nominal wheel torque signals from processor 10 to provide desired wheel torque signals on output lead 18.

More particularly, the functions carried out by the system of FIG. 1 are as follows:

First, when the system contains N momentum wheels with axes $w_1, \ldots, w_N$, form D as the following 3×N matrix $$D = \begin{bmatrix} b_x \cdot w_1 & \cdots & b_x \cdot w_N \\ b_y \cdot w_1 & \cdots & b_y \cdot w_N \\ b_z \cdot w_1 & \cdots & b_z \cdot w_N \end{bmatrix} \tag{10}$$

Next form the columns matrices $V_1, \ldots, V_M$ such that they form an orthonormal basis for the row nullspace of D, where $M \underline{\Delta} N - 3$.

Then define the scalars $z_1, \ldots, z_M$ as the scalar projection of $w_1, \ldots, w_N$ in the nullspace of D $$z_i \overset{\Delta}{=} V_i^T \begin{bmatrix} \omega_1 \\ \vdots \\ \omega_N \end{bmatrix} \tag{11}$$

When $z_1, \ldots, z_M$ are zero, the wheels are at their least squares optimal speeds.

Next use the pseudo-inverse to determine values of the nominal torques $\overline{T}1, \ldots, \overline{T}N$ which produce the desired control torques $T_x, T_y, T_z$ while minimizing $\overline{T}1^2 + \ldots + \overline{T}N^2$. Note that although this produces reasonable values for $\overline{T}1, \ldots, \overline{T}N$ it does nothing to ensure that the wheel speeds remain reasonable.

Then determine the values for $\Delta T_1, \ldots, \Delta T_N$ as $$\begin{bmatrix} \Delta T_1 \\ \vdots \\ \Delta T_N \end{bmatrix} = \sum_{i=1}^{M} C_i V_i \tag{12}$$

where $$C_i(k_p z_i + k_I \int z_i dt) \tag{13}$$

When $k_P$ and $k_I$ are appropriate negative constants, adding these delta torques to the nominal torques will drive the values of $z_1, \ldots z_M$ to zero, thus moving the wheels to their optimal speeds. Since adding $V_1, \ldots, V_M$ to the wheel torques does not affect the overall torque on the spacecraft, this wheel speed compensation does not affect the spacecraft control.

Finally, add the delta torques to the nominal torques $$\begin{bmatrix} T_1 \\ \vdots \\ T_N \end{bmatrix} = \begin{bmatrix} \overline{T}_1 \\ \vdots \\ \overline{T}_N \end{bmatrix} + \begin{bmatrix} \Delta T_1 \\ \vdots \\ \Delta T_N \end{bmatrix} \tag{14}$$

Both the present invention and the cited Goodzeit et al. patent U.S. Pat. No. 5,058,835 start by calculating a set of nominal control torques $T_1, \ldots, T_N$ and then determine values for $\Delta T_1, \ldots, \Delta T_N$ which, when added to the nominal control torques, cause the wheels to go towards their optimal speeds. However, the manner in which the two inventions determine values for $\Delta T_1, \ldots, \Delta T_N$ are fundamentally different. U.S. Pat. No. 5,058,835 requires forming a wheel speed error matrix $e_1, \ldots, e_N$ which represents the difference between the current wheel speeds and the optimal wheel speed and the optimal wheel speeds. The disclosed invention however, instead of controlling the wheel speed error, controls the nullspace components of the wheel speeds. This saves data storage and many calculations by avoiding the costly and unnecessary step of forming a wheel speed error matrix.

It should be noted that in the case of four wheels, the disclosed invention describes the excess speed in terms of one error parameter $z_1$ while U.S. Pat. No. 5,058,835 uses four error parameters $e_1$, $e_2$, $e_3$, and $e_4$. In the following table, The amount of data storage and the number of calculations associated with U.S. Pat. No. 5,058,835 are compared with those associated with the disclosed present invention are listed as follows:

|  | U.S. Pat. No. 5,058,835 | Invention |
| --- | --- | --- |
| Data Storage | 18 | 6 |
| Integrators | 4 | 1 |
| Multiplications | 24 | 10 |
| Additions | 16 | 5 |

Thus, it is seen that the system of U.S. Pat. No. 5,058,835 is significantly less efficient because it controls the wheel speed errors, while the disclosed present invention controls the nullspace components of the wheel speeds.

Figure 2:
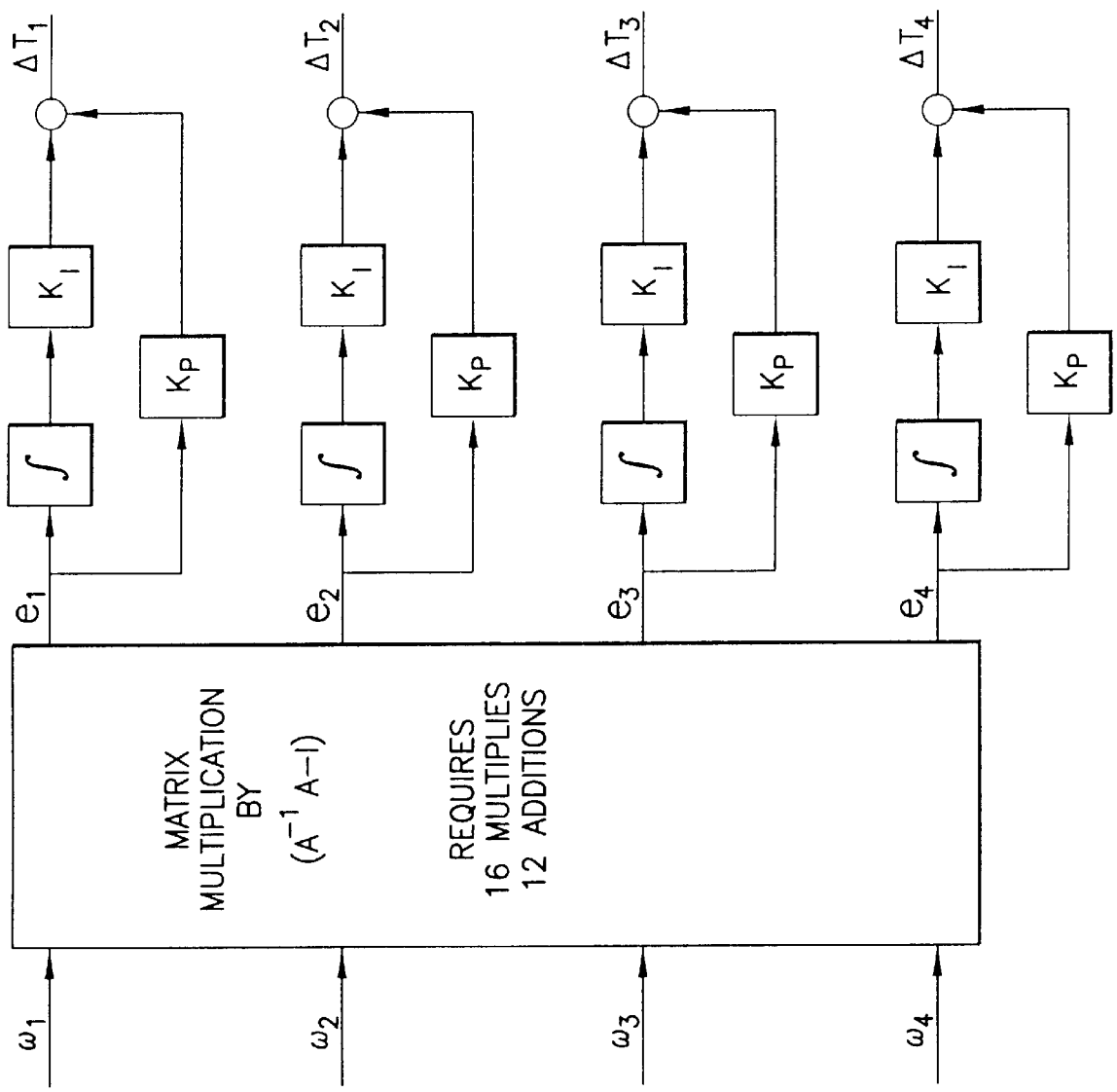
FIG. 2 is a schematic block diagram of components of a prior art wheel control system.

Referring to FIG. 2, in U.S. Pat. No. 5,058,835, the first method step is to determine the current wheel speeds $\omega_1$, $\omega_2$, $\omega_3$, $\omega_4$ and calculate the 4 wheel speed errors by pre-multiplying the wheel speed matrix by the 4×4 matrix $F = D^+D - I$ where $D^+$ is the pseudo-inverse of D and I is the 4×4 identity matrix.

$$\begin{bmatrix} e_1 \\ e_2 \\ e_3 \\ e_4 \end{bmatrix} = \begin{bmatrix} F_{11} & F_{12} & F_{13} & F_{14} \\ F_{21} & F_{22} & F_{23} & F_{24} \\ F_{31} & F_{32} & F_{33} & F_{34} \\ F_{41} & F_{42} & F_{43} & F_{44} \end{bmatrix} \begin{bmatrix} \omega_1 \\ \omega_2 \\ \omega_3 \\ \omega_4 \end{bmatrix} \tag{15}$$

Then calculate the following 4 integrals $$I_1 = \int e_1 dt \tag{16}$$
$$I_2 = \int e_2 dt$$
$$I_3 = \int e_3 dt$$
$$I_4 = \int e_4 dt$$

These wheel torques $T_1, \ldots, T_N$ will produce the desired control torques $T_x, T_y, T_z$ while driving the wheel speeds to their least-squares optimal speeds.

The values for $\Delta T$ can then be calculated by $$\begin{bmatrix} \Delta T_1 \\ \Delta T_2 \\ \Delta T_3 \\ \Delta T_4 \end{bmatrix} = \begin{bmatrix} k_p e_1 + k_I I_1 \\ k_p e_2 + k_I I_2 \\ k_p e_3 + k_I I_3 \\ k_p e_4 + k_I I_4 \end{bmatrix} \quad (17)$$

which produces the desired accelerations and causes the wheel speed to go towards their optimal values.

Figure 3:
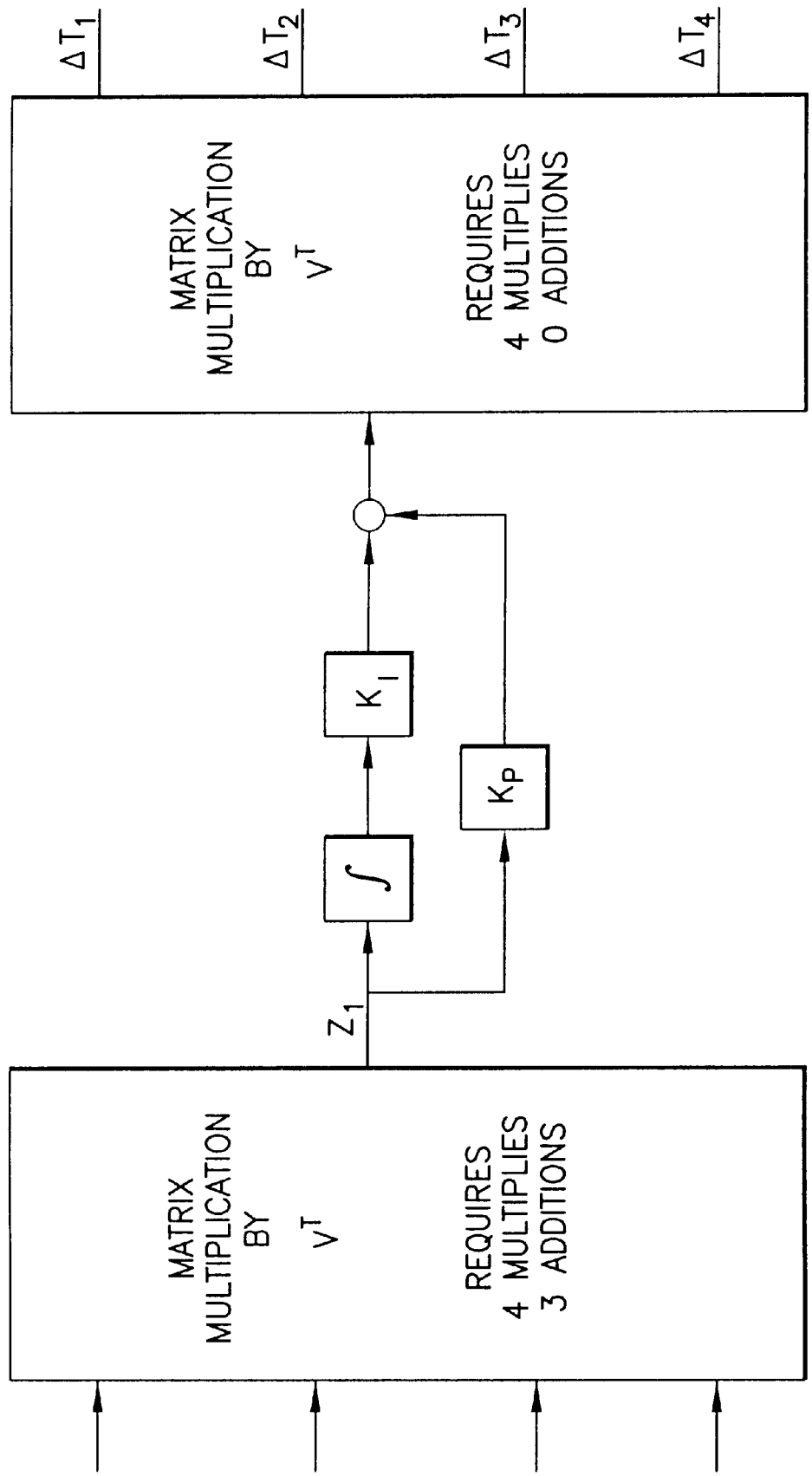
FIG. 3 is a schematic block diagram of components of an embodiment of a wheel speed control system according to the principles of the present invention.

However, referring to FIG. 3, in the disclosed present invention the first step is to determine the current wheel speeds $\omega_1$, $\omega_2$, $\omega_3$, $\omega_4$, and calculate the nullspace scalar projection $z_1$.

$$z_1 = V_1^T \begin{bmatrix} \omega_1 \\ \omega_2 \\ \omega_3 \\ \omega_4 \end{bmatrix} \quad (18)$$

where $z_1$ is a scalar and $V_1$ is a column matrix.

Then calculate the following integral $$I_1 = \int z_1 dt \quad (19)$$

The values of $\Delta T$ can be calculated as $$\begin{bmatrix} \Delta T_1 \\ \Delta T_2 \\ \Delta T_3 \\ \Delta T_4 \end{bmatrix} = (k_p z_1 + k_I I_1) V_1 \quad (20)$$

where $k_p$, $z_1$, $k_I$, and $I_1$ are scalars and $V_1$ is a column matrix.

Use of equations (19) and (20) drives the nullspace wheel momentum to zero. Although nullspace wheel momentum is undesirable in general, there are some situations where it is desirable to control the nullspace wheel momentum to a specified non-zero value. Replacing "$z_1$" with "$(z_1 - \bar{z}_1)$" in equation (19) and (20) causes the nullspace wheel momentum to be controlled to $\bar{z}_1$.

The disclosed present invention can easily be modified for use in systems with differing wheel inertias, and instead of minimizing $$\sum_{i=1}^{N} \omega_i^2,$$

a weighted least squares can be used such that $$\sum_{i=1}^{N} \sum_{j=1}^{N} k_{ij} \omega_i \omega_j$$

is minimized.

The disclosed invention applies to any system containing supernumerary active wheels. For example, it applies to systems 4 or more wheels which together store three-dimensional angular momentum, or to systems of 3 or more wheels which together store two-dimensional angular momentum, or to systems of 2 or more wheels which together store-one dimensional angular momentum. The invention applies not only to spacecraft, but to any vehicle of system which uses angular momentum storage.

What has been described is an improved wheel speed control system for spacecraft momentum wheels that controls wheel speed nullspace components to reduce wheel speed nullspace components to zero.

While the invention has been described in connection with a preferred embodiment, it is not intended to limit the scope of the invention or the particular form set forth, but on the contrary, it is intended to cover such alternatives, modifications, and equivalence as may be included within the spirit and scope of the invention as defined in the appended claims.

What is claimed is:

1. In a body containing supernumerary active angular momentum storage devices, a processing means comprising means for determining a set of actuator torques to cause said storage devices to exert the desired control torque on said body, and means for causing the nullspace components of the angular speeds of said storage devices to move towards specified values.

2. The processing means of claim 1 wherein said angular momentum storage devices are reaction wheels.

3. A control system for a spacecraft, comprising:

$N \geq 4$ active reaction wheels configured to provide three-dimensional angular momentum storage, said reaction wheels adapted to receive torque drive signals for torquing said spacecraft under the control of said torque drive signals, sensing means for determining or estimating wheel speed signals $\omega_1, \ldots, \omega_N$, attitude control means coupled to said sensing means for generating torque control signals $T_x, T_y, T_z$, a first computational means responsive to said torque signals $T_x, T_y, T_z$ to provide output signals $\bar{T}_1, \ldots, \bar{T}_N$, representative of nominal wheel torques, a second computational means responsive to said wheel speed signals $\omega_1, \ldots, \omega_N$ to provide $M \underline{\geq} N-3$ output signals $z_1, \ldots, z_M$ which are scalar nullspace values of said wheel speeds, a third computational means responsive to said output signals $z_1, \ldots, z_M$ for generating delta torque signals $\Delta T_1, \ldots, \Delta T_N$, and means for combining said delta torque signals and said nominal wheel torque signals to produce wheel torque signals which provide the desired wheel torques which provide the desired control torques $T_x, T_y, T_z$ while keeping speeds small by controlling said output signals $z_1, \ldots, z_M$ to desired values.

4. A control system according to claim 3 further including integrator means connected to said output signals $z_1, \ldots z_M$ to provide integrator signals $I_1, \ldots, I_M$ and wherein said third computational means is responsive to said output signals $z_1, \ldots, z_M$ and said integrator signals $I_1, \ldots I_M$ for generating delta torque signals $\Delta T_1, \ldots, \Delta T_N$.

5. A control system according to claim 3 wherein said desired values of $z_1, \ldots, z_M$ are zero.

6. A control system for a spacecraft, comprising:

$N \geq 3$ active reaction wheels configured to provide two-dimensional angular momentum storage, said reaction wheels adapted to receive torque drive signals for torquing said spacecraft under the control to said torque drive signals, sensing means for determining or estimating wheel speed signals $\omega_1, \ldots \omega_N$, attitude control means coupled to said sensing means for generating torque signals $T_x, T_y$, a first computational means responsive to said torque signals $T_x, T_y$ to provide output signals $\bar{T}_1, \ldots, \bar{T}_N$, representative of nominal wheel torques, a second computational means responsive to said wheel speed signals $\omega_1, \ldots, \omega_N$ to provide M$\underline{\Delta}$N−2 output signals $z_1, \ldots, z_M$ which are scalar nullspace values of said wheel speeds, a third computational means responsive to said output signals $z_1, \ldots, z_M$ for generating delta torque signals $\Delta T_1, \ldots \Delta T_N$, and means for combining said delta torque signals and said nominal wheel torques to provide wheel torque signals which provide the desired control torques $T_x, T_y$ while keeping speeds small by controlling said output signals $z_1, \ldots, z_M$ to desired values.

7. A control system according to claim 6 further including integrator means connected to said output signals $z_1, \ldots, z_M$ to provide integrator symbols $I_1, \ldots, I_M$ and wherein said third computational means is responsive to said output signals $z_1, \ldots, z_M$ and said integrator signals $I_1, \ldots, I_M$ for generating delta torque signals $\Delta T_1, \ldots, \Delta T_N$.

8. A control system according to claim 6 wherein said desired values of $z_1, \ldots, z_M$ are zero.

9. A control system for a spacecraft, comprising:

N$\geq$2 active reaction wheels, configured to provide one-dimensional angular momentum storage, said reaction wheels adapted to receive torque drive signals, for torquing said spacecraft under control of said torque drive signals, sensing means for determining or estimating wheel speed signals $\omega_1, \ldots, \omega_N$ attitude control means coupled to said sensing means for generating torque control signal $T_x$, a first computational means responsive to said torque signal $T_x$ to provide output signals $\overline{T}_1, \ldots \overline{T}_N$, representative of nominal wheel torques, a second computational means responsive to said wheel speed signals $\omega_1, \ldots, \omega_N$ to provide M$\underline{\Delta}$N−1 output signals $z_1, \ldots, z_M$ which are scalar nullspace values of said wheel speeds, a third computational means responsive to said output signals $z_1, \ldots, z_M$ for generating delta torque signals $\Delta T_1, \ldots, \Delta T_N$, and means for combining said delta torque signals and said nominal wheel torque signals to produce the wheel torque signals which provide the desired wheel torques which provide the desired control torque $T_x$ while keeping speeds small by controlling said output signals $z_1, \ldots, z_M$ to desired values.

10. A control system according to claim 9 further including integrator means connected to said output signals $z_1, \ldots, z_M$ to provide integrator signals $I_1, \ldots, I_M$ and wherein said third computational means is responsive to said output signals $z_1, \ldots, z_M$ and said integrator signals $I_1, \ldots, I_M$ for generating delta torque signals $\Delta T_1, \ldots, \Delta T_N$.

11. A control system according to claim 9 wherein said desired values of $z_1, \ldots, z_M$ are zero.

12. A control system for a spacecraft, comprising:

attitude control sensing means for generating attitude signals representative of spacecraft 3-axis x, y, z, attitude having N reaction wheels rotating at wheel speeds $\omega_1, \omega_2, \omega_3, \ldots \omega_N$ and adapted to receive torque drive signals for torquing said spacecraft under the control of said torque drive signals;

attitude control means coupled to said attitude control sensing means for processing at least said attitude signals for generating torque control signals $T_x, T_y, T_z$;

a control means connected to said attitude control means and responsive to said torque control signals and connected to said reaction wheels and responsive to wheel speed signals, said control means including a matrix signal generator means responsive to said torque signals Tx, Ty, Tz to provide output signals $\overline{T}_1, \ldots, \overline{T}_N$ representative of nominal wheel torques, a first computational means responsive to said wheel speed signals to provide output signals $z_1, \ldots, z_M$ which are scalar nullspace values of said wheel speeds, a second computational means responsive to said output signals $z_1, \ldots, z_M$ for generating delta torque signals $\Delta T_1, \ldots, \Delta T_N$, and means for combining said $\Delta T_1, \ldots, \Delta T_N$, signals and said nominal wheel torque signals $\overline{T}_1, \ldots, \overline{T}_N$ to produce wheel torque signals which provide the desired control torques $T_x, T_y, T_z$ while keeping wheel speeds small by controlling said $z_1, \ldots, z_M$ signals to a desired value.

13. A control system according to claim 12 further including integrator means connected to said output signals $z_1, \ldots, z_M$ to provide integral signals $I_1, \ldots, I_M$ and wherein said second computation means is responsive to said output signals $\Delta T_1, \ldots, \Delta T_N$, and means for combining said $\Delta T_1, \ldots, \Delta T_N$, signals and said nominal wheel torque signals $\overline{T}_1, \ldots, \overline{T}_N$ to produce wheel torque signals which provide the desired control torques $T_x, T_y, T_z$ while keeping wheel speeds small by controlling said $z_1, \ldots, z_M$ signals to a desired value.

14. A control system according to claim 12 wherein said desired values of $z_1, \ldots, z_M$ is zero.

15. A control system according to claim 12 wherein N is at least four reaction wheels providing three-dimensional momentum storage and said first computational means provides output signals $z_1, \ldots, z_{N-3}$.

16. A control system according to claim 12 wherein N is at least three reaction wheels providing two-dimensional momentum storage and said first computational means provides output signals $z_1, \ldots, z_{N-2}$.

17. A control system according to claim 13 wherein N is at least four reaction wheels providing three-dimensional momentum storage, said first computational means provides output signals $z_1, \ldots, z_{N-3}$ and wherein said integrator means provides integral signals $I_1, \ldots, I_{N-3}$.

18. A control system according to claim 13 wherein N is at least three reaction wheels providing two-dimensional momentum storage, said first computational means provides output signals $z_1, \ldots, z_{N-2}$ and wherein said integrator means provide integral signals $I_1, \ldots, I_{N-2}$.

19. A control system according to claim 15 wherein said desired values of $z_1, \ldots, z_{N-3}$ is zero.

20. A control system according to claim 16 wherein said desired values of $z_1, \ldots, z_{N-2}$ is zero.

\* \* \* \* \*